(12) United States Patent
Maekawa

(10) Patent No.: US 6,811,660 B2
(45) Date of Patent: Nov. 2, 2004

(54) APPARATUS FOR PURIFYING WATER CONTAINING DISSOLVED ORGANIC MATTERS AND TRACE HARMFUL SUBSTANCES

(76) Inventor: Takaaki Maekawa, 802-36, Edosakiotsu, Edosakimachi, Inashiki-gun, Ibaraki (JP)

( * ) Notice: Subject to any disclaimer, the term of this patent is extended or adjusted under 35 U.S.C. 154(b) by 119 days.

(21) Appl. No.: 10/220,295
(22) PCT Filed: Dec. 27, 2001
(86) PCT No.: PCT/JP01/11591
§ 371 (c)(1),
(2), (4) Date: Sep. 11, 2002
(87) PCT Pub. No.: WO02/053504
PCT Pub. Date: Jul. 11, 2002

(65) Prior Publication Data
US 2003/0029796 A1 Feb. 13, 2003

(30) Foreign Application Priority Data
Dec. 28, 2000 (JP) .......................... 2000-402443

(51) Int. Cl.$^7$ ............................................... B23H 3/04
(52) U.S. Cl. .................. 204/290.01; 204/229.2; 205/742; 205/744; 205/759; 205/766; 205/769
(58) Field of Search ................................. 205/742, 744, 205/759, 766, 769; 204/229.2, 290.1

(56) References Cited

FOREIGN PATENT DOCUMENTS

| JP | 2001-17971 | 1/2001 |
|---|---|---|
| JP | 2001-286866 | 10/2001 |
| WO | WO 00/55097 | 9/2000 |

*Primary Examiner*—Wesley A. Nicolas
(74) *Attorney, Agent, or Firm*—Westerman, Hattori, Daniels & Adrian, LLP

(57) ABSTRACT

Various kinds of wastewater and water such as methane fermentation digestion liquids, domestic wastewater, sewage, service water, culture pond water, wastewater defined by an active sludge law and wastewater from food industries are decomposed, cleaned and treated with a high efficiency with oxygen radicals, hydroxyl radicals and diphenyl para picrihydoral radicals, and injurious materials are decomposed, cleaned and treated by oxidizing and reducing functions. An apparatus for cleaning dissolved organic matters and a trace amount of injurious materials consisting of a anode which is formed or welded by coating clay or glass with a material prepared by mixing 2 to 15% by weight of a transition metal with 1 to 10% of an oxidized transition metal and sintering the glass within a range from 800 to 1500° C. as a glaze or coating a surface of a metal is with a mixture of anatase type titanium oxide, tin oxide, ruthenium oxide and fine particles of platinum as a glaze and sintering the glaze once again at a temperature of 580 to 980° C.

10 Claims, 10 Drawing Sheets

(a)  (b)

(c)

(a)

(b)

(a)

(b)

APPARATUS FOR PURIFYING WATER CONTAINING DISSOLVED ORGANIC MATTERS AND TRACE HARMFUL SUBSTANCES

TECHNICAL FIELD

The present invention relates to a method and an apparatus for cleaning methane fermentation digestion liquids, domestic wastewater, sewage, service water, culture pond water, wastewater produced by an activated sludge method, wastewater from food industries and the like.

BACKGROUND ART

Contamination of water environments is being made more and more serious by developments of industries and economy as well as rising of living levels of human lives. Eutrophication of water areas is made serious by nitrogen, phosphorus and the like which are contained in wastewater produced by agriculture and human lives. Furthermore, health of mankind is threatened by increase of organic matters, organic chlorine compounds, aromatic compounds, environmental hormones and the like contained in industrial wastewater. It is deemed difficult to completely treat such contaminants by a traditional water treating method such as a biological method. Under the present circumstances where legal regulations on environments are being strengthened, on the other hand, it is desired to construct an efficient wastewater treating system in order to maintain a stable ecosystem for a long time and preserve water resources having high safeties. It is therefore attempted to develop a new water treating technique which is to take the place of the biological method and an organic wastewater treatment by an electrochemical technique has been developed in recent years in particular.

A characteristic of the electrochemical treating technique lies in integration of technologies in different domains (for example, electronic engineering, catalytic technology, physical chemistry, microbiology and the like) and fusing techniques in different fields, thereby treating organic wastewater containing contaminants which are deemed hardly decomposable by the biological method.

The electrochemical treating technique is not only capable of removing solid matters and green powder contained in wastewater with a high efficiency without using a flocculant agent and suppressing a running cost at a low level but also produces sludge in an amount smaller than that of sludge produced by the biological treating method and allows the sludge to be reutilized as a fertilizer since the electrochemical technique does not use chemicals.

The electrochemical treatment has a floating function, an agglomerating precipitating function and an oxidizing function. The solid matters and the organic dissolved matters contained in soil water are removed by these three functions. Out of these functions, the oxidizing function is the most important and can be divided into direct oxidation and indirect oxidation. The direct oxidation oxidizes an organic matter directly on a surface of an oxidized metal by a catalytic function of the oxidized metal such as titanium oxide, tin oxide or the like. The indirect oxidation oxidizes with an $^{-}OH$ radial generated from water by anode discharge.

A reaction formula is:

$$H_2O + M[\ ] \rightarrow M[^{-}OH] + H^+ + e^- \quad (1)$$

A reaction formula of the organic matter by hydroxyl radicals is:

$$R + [^{-}OH] \rightarrow M[\ ] + RO + H^+ + e^- \quad (2)$$

wherein a reference symbol M [ ] represents an active site on the surface of the oxidized metal and a reference symbol R designates the organic matter.

Ozone sending and irradiation with ultrasonic waves or electromagnetic ultrasonic waves are available as methods to generate oxygen radicals and hydroxyl radicals. Furthermore, though there has been developed a method which uses an optical catalytic reaction by titanium oxide, this method generates radicals in an amount small for a high input electric power, decomposes injurious materials with a low efficiency and requires a high cost of an apparatus. Furthermore, ozone is not effective for fresh water though ozone is deemed effective for sea water containing large amounts of bromine and manganese.

Furthermore, attention is paid to use of a transition metal such as cobalt, manganese or the like in combination with hydrogen peroxide. Though it is known the combination of the transient metal and oxygen peroxide generates radicals at an efficiency higher than that of ozone, this method require a delicate technique and final treatment of hydrogen peroxide in an outlet port since hydrogen neroxide has a variability for organisms high enough to be inhibited from being added to food.

It is known that the electrochemical treating method allows oxygen radicals and hydroxyl radicals to be generated with a lifetime of 10 $\mu$s to 100 ms from existing water molecules when electrons enter pores existing in a surface of a material which is composed of fine particles of titanium oxide, tin oxide, ruthenium oxide, platinum or the like (see specification of Japanese Patent Application No. 11-68862). It is known that this radical oxidatively destructs organic substances including carbon sources and nitrogen sources as well as hardly decomposable aromatic substances contained in water.

It is indicated that a specific condition of an electric field to be applied between electrodes exists and it is necessary to prolong a time of contact between wastewater and a surface of a metal oxide for generation of the oxygen radicals and hydroxyl radicals with a high efficiency on the surface of the metal oxide, that it is necessary to clean surfaces of electrodes by transmitting ultrasonic waves when a large amount of floating suspended matters are contained in wastewater, and that a voltage, a current and an electric field frequency are governed by movements of electrons on the surface of the oxidized metal or the surface of the metal.

Since an invention described in the specification of the above mentioned application poses a problem that generation of superoxide radicals is insufficient in a high frequency region and excessive in a low frequency region, a problem that a current is unstable during treatment of wastewater containing a large amount of ions and the like, it is necessary to establish a treating method by combining a low frequency low current with a high frequency slight current and contrive to stabilize voltage pulse application when electric resistance of raw water changes during a treatment.

In order to solve the problems posed by the invention described in the specification of the above mentioned application, the applicant applied "Method and Apparatus for Cleaning Dissolved Organic Matters and Trace Amount of Injurious Materials" (Application 2000-29570 hereinafter referred to as "specification of preceding application") on February 2, Heisei 12.

An invention described in the specification of the preceding application disclosed a water purifying method characterized by coating a surface of a ceramic having a main body of feldspar or silicon with fine particles of titanium oxide, cobalt oxide, tin oxide, ruthenium oxide, iridium oxide, nickel oxide, iron oxide and vanadium oxide, fine metal particles of titanium, cobalt, nickel, silver and gold or a liquid consisting of a mixture these metals and a solution of the same kinds of metal salts, using as an electrode having a positive polarity the above described metal oxides or metals or the mixture thereof sintered in a temperature region of 800° C. to 1500° C. after a drying treatment and disposing an electrode which has a cathode made of platinum or titanium or stainless steel so as to be opposed to an anode for use of these electrode as a radical generating zone, continuously flowing wastewater between both the electrodes of these electrodes opposed to each other, causing pulse discharge between the electrodes under conditions of a voltage of 0.2 kV/cm to 20 kV/cm, an average current of $1\,\mu A/cm^2$ to $10\,mA/cm^2$ and a frequency of 5 Hz to 50 MHz, thereby generating radicals by partial decomposition of water and oxidatively-reductively decomposing organic matters and intermediate products thereof dissolved in water.

Furthermore, the invention described in the specification of the preceding application disclosed a water cleaning apparatus for carrying out the above described water purifying method.

FIG. 9 shows an electrode section in which a anode and a cathode are disposed in opposition to each other. A reference numeral 51 in FIG. 9 represents a anode which has a groove extending in a direction of running water denoted by a reference numeral 52. The anode portion 51 is formed by coating a surface of a ceramic (non-metallic inorganic material including glass) having a main body of feldspar or silicon or a metal such as titanium with fine particles of titanium oxide, cobalt oxide, tin oxide, iridium oxide, nickel oxide, iron oxide and vanadium oxide, metal fine particles of titanium, cobalt, nickel, silver, gold and platinum or a liquid consisting of a mixture of the metals and a solution of the same kinds of metal salts, and sintering or welding the metals in a temperature region of 500° C. to 1500° C. A cathode 53 is made of platinum or titanium or stainless steel.

The anode 51 and a cathode 53 are disposed in opposition to each other and have a configuration in which the electrodes are enclosed by an outside cell 54. For a water treatment, water to be treated is sent from a lower portion (indicated by an arrow) to an upper portion of the outside cell 54 which is made of a high polymer resin such as acrylic resin, polyethylene resin or the like, and an angle θ between bottom surfaces of both the electrodes opposed to each other and a foot of the cell is set at 30° to 90°, thereby bringing most portion of contaminants in the water to be treated is brought into secure contact with the anode. The contaminants in the water to be treated are decomposed with a high efficiency by radicals which are generated from the anode 51.

FIG. 10 shown sectional configurations of water treating apparatuses: (a) showing a cylindrical circular truncated cone electrode type and (b) showing a truncated pyramid electrode type.

In FIGS. 10(a) and 10(b) showing the cylindrical circular truncated cone electrode type and the truncated pyramidal water treating apparatuses, a reference numeral 73 represents a raw water inlet port, a reference numeral 74 designates an anode electrode, a reference numeral 75 denotes a cathode electrode, a reference numeral 76 represents an overcoat (serving also as a cathode), a reference numeral 77 designates a treated water outlet port, a reference numeral 78 denotes a generated gas discharge port, a reference numeral 79 represents an electric insulating material and a reference numeral 79a designates a through hole formed in the insulating material 79 for passing raw water.

The truncated pyramid electrode type water treating apparatus shown in FIG. 10(b) uses electrodes which are formed by inserting the anode 74 made of metals and metal oxides into the overcoat 76 of the metallic cathode 75, placing a titanium plate, a platinum plate and a platinum bar at a center portion, and connecting these plates and bar to the overcoat portion.

The cylindrical circular truncated cone electrode type water treating apparatus shown in FIG. 10(a) has a configuration in which the water treating apparatus has a cylindrical or circular truncated conical structure having an angle θ set at 30° to 90° between bottom surfaces of two anodes opposed to each other and a foot of a cell, an inside surface and an outside surface of this cylinder are composed of metal surfaces which are coated with powders of the above described oxidized metals, powders of the same metals or a mixture liquid consisting of a mixture thereof and salts of the same metals and sintered, a cathode having a form of a round bar or a square bar made of platinum, titanium or stainless steel is disposed at a center location of the cylindrical truncated cone, an outside of the cylindrical truncated cone is sealed with an overcoat container consisting of a metal container made of titanium, stainless steel or the like, a cathode is composed by disposing the above described overcoat container in a wastewater inlet port, a wastewater outlet port and a generated gas outlet port, and an inside surface and an outside surface of the cylindrical truncated cone are used as a radical generating zone so that organic wastewater is sent from a portion of having a large diameter inside the cylindrical truncated cone, comes out to a portion having a small diameter, flows again outside the cylindrical truncated cone in a direction reverse to that inside, and is oxidatively and reductively treated by generated radicals.

The truncated pyramidal electrode type water treating apparatus shown in FIG. 10(b) has a configuration in which a anode is configured as a flat plate having an angle θ set at 30° to 90° between both bottom surfaces and roots of both electrodes opposed to each other, two flat plates positioned perpendicular to a thickness direction of the flat plate are composed of metal surfaces which are coated with the powders of the above described oxidized metals, the powders of the metals or the mixture liquid consisting of the mixture thereof and salts of the same metals and sintered, the two flat plates are disposed so as to be symmetrical with regard to a plane, further two side surfaces of the two flat plates which are not the oxidized metal surfaces are joined using a flat plate having a surface of titanium, stainless steel or the same metal on one side and composed as a truncated pyramid so as to uniformalize an anode voltage, an overcoat container is composed at a location symmetrical with a metal surface at a center of the truncated pyramid with regard to a plane by scaling outsides of a cathode electrode composed of a titanium plate, a stainless steel plate, a platinum net or platinum round bar and the truncated pyramid with a titanium or stainless steel container and a cathode is composed by disposing the above described overcoat container in a wastewater inlet port, a wastewater outlet port and a generated gas outlet port so that inside surfaces and outside surfaces of the two flat plates coated with the metal oxides serve as a radical generating zone, organic wastewater is sent from a portion having a large diameter or length inside the truncated pyramid, and organic matters and injurious materials contained in the wastewater coming out to a portion having a small diameter or length are oxidatively and reductively decomposed and treated by generated radicals while the wastewater flows again outside the truncated pyramid in a direction reverse to that inside.

Though the water treating apparatus and method described in the specification of the preceding application are epoch making water treatment apparatus and method, it has been found that these apparatus and method hardly allow a continuous operation since the continuous operation results in events such as accumulation of bubbles in a top section of the apparatus.

The present invention has an object to provide a water treating apparatus which is capable of operation continuously.

DISCLOSURE OF INVENTION

The present invention provides an apparatus for cleaning dissolved organic matters and a trace amount of injurious materials consisting of a anode which is formed by mixing clay and/or glass with 2 to 15% by weight of transition metals and 1 to 10% of oxidized transition metals, sintering the mixture within a range from 800 to 1500° C. or coating a surface of a metal such as titanium with a mixture of fine particles of anatase type titanium oxide, tin oxide, ruthenium oxide and platinum as a glaze and sintering the mixture once again at a temperature from 580 to 980° C.

Furthermore, the apparatus according to the present invention is characterized in that the above described anode is configured in a cylindrical form and an electrically conductive metal is fitted in an end of the anode.

Furthermore, the apparatus according to the present invention is characterized in that at least an electrically conductive metal is inserted in parallel with an axis of the above described cylindrical anode.

Furthermore, the apparatus according to the present invention is characterized in that a pulse voltage and a current are applied to the above described electrically conductive metal.

Furthermore, the apparatus according to the present invention is characterized in that a cathode is disposed at a center of the above described cylindrical anode. Furthermore, the apparatus according to the present invention is characterized in that the above described anode and the above described cathode are set in a condition where the anode and cathode are submerged in water and connected to an oscillator which oscillates an average current density of 0.1 $\mu A/cm^2$ to 10 $mA/cm^2$ at a frequency of 5 Hz to 50 MHz and a voltage of 0.2 kV/cm to 20 kV.

Furthermore, the apparatus according to the present invention is characterized in that raw water is flowed downward from an upper portion to a lower portion of the side wall of the above described anode and oxidized and cleaned by various kinds of active species (radials) generated between the above described cathode and anode.

Furthermore, the apparatus according to the present invention is characterized by being composed of a anode configured in a form which has a rectangular or truncated pyramidal concave portion.

Furthermore, the apparatus according to the present invention is characterized in that a transition oxidized metals is sintered at 580° C. to 980° C. in the concave portion of the above described anode and electrically conductive metal plates are formed on both sides of the electrode as a cathode by way of an insulating material.

Furthermore, the apparatus according to the present invention is characterized in that the above described anode measures 5 to 10 mm thick by 5 to 100 cm wide by 10 to 70 cm high.

BEST MODE FOR CARRYING OUT THE INVENTION

Figure 1:
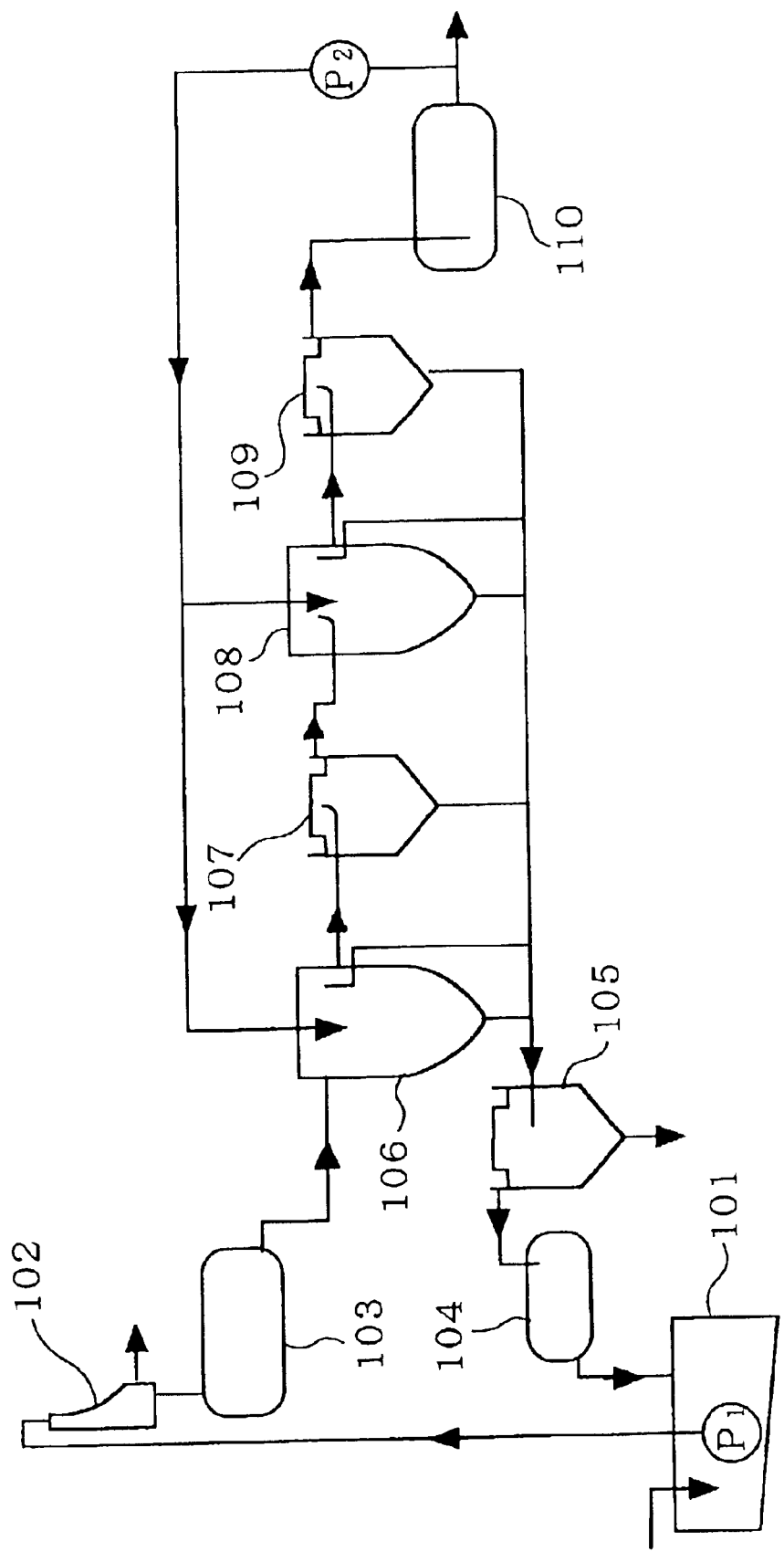
FIG. 1 is a flow chart showing an overall configuration of the water treating apparatus according to the present invention and a treatment flow.

Embodiments of the present invention will be described in detail with reference to the accompanying drawings. FIG. 1 is a flow chart showing an overall configuration of a water treating apparatus and a treating flow, in FIG. 1, a reference numeral 101 represents an inflow adjusting tank, a reference numeral 102 designates a dust removing screen, a reference numeral 103 denotes a header tank, a reference numeral 104 represents a sludge thickening tank, a reference numeral 105 designates a sludge thickening tank, a reference numeral 106 denotes a first electrode tank, a reference numeral 107 represents a first setting tank, a reference numeral 108 designates a second electrode tank, a reference numeral 109 denotes a second setting tank, a reference numeral 110 represents a temporal reservoir, a reference symbol P1 designates a liquid feeding pump and a reference symbol P2 denotes a flushing high-pressure pump.

Domestic wastewater to be treated (hereinafter referred to as "raw water to be treated") is flowed into the inflow adjusting tank 101, sent to the screen 102 by the liquid feeding pump P1 and flowed into the header tank 103 after suspended matters have been removed from the wastewater. The header tank 103 which is disposed for stable water supply to a next step also has a function to accelerate precipitation. Supernatant in the header tank 103 flows into the first electrode tank 106 (oxidizing tank). Since oxygen radical ($^-$O) are mainly generated in the first electrode tank 106 to which a low voltage is applied, organic substances contained in the raw water to be treated are oxidized and solid matters are agglomerated and precipitated.

A voltage which is applied to the first electrode tank 106 (oxidizing tank) is 240 to 500 V and a current density is 40 to 50 mA/cm$^2$.

Supernatant water of wastewater which is oxidatively treated by the first electrode tank 106 flows into the first setting tank 107 for a precipitating treatment for a definite time and supernatant flows from the first setting tank into the second electrode tank 108 (reducing tank). Since hydroxyl radicals ($^-$OH) are mainly generated in the second electrode tank 108 to which high-voltage pulses are applied, hardly decomposable substances such as nitrogen in a condition of ammonia contained in supernatant in the oxidizing tank 106 are decomposed and solid matters are agglomerated and precipitated.

A voltage applied to the second electrode tank 108 (reducing tank) is 2000 to 5000 V and a current density is 50 to 70 μA/cm$^2$.

Supernatant water of wastewater treated in the second electrode tank 108 flows into the second setting tank 109 and, after a precipitating treatment is performed for a definite time, supernatant water in the second setting tank 109 flows into the temporal reservoir 110 and then is discharged.

Since solid matters and the like are precipitated in each of the electrode tanks 106 and 108, precipitate is discharged and flowed into the sludge thickening tank 105 by spraying discharged water at a high pressure into each of the tanks 106 and 108 with a flushing high-pressure pump P2 in a condition where the treatment is intercepted as occasion demands. Furthermore, precipitate in each of the setting tanks 107 and 109 is also discharged appropriately into the sludge thickening tank 105.

Supernatant water in the sludge thickening tank 105 flows into the sludge thickening tank 104, then is returned into the inflow adjustment tank 101 and treated once again. Solid matters and the like precipitated in the sludge thickening tank 105 is discharged and then treated as solid matters.

Figure 2:
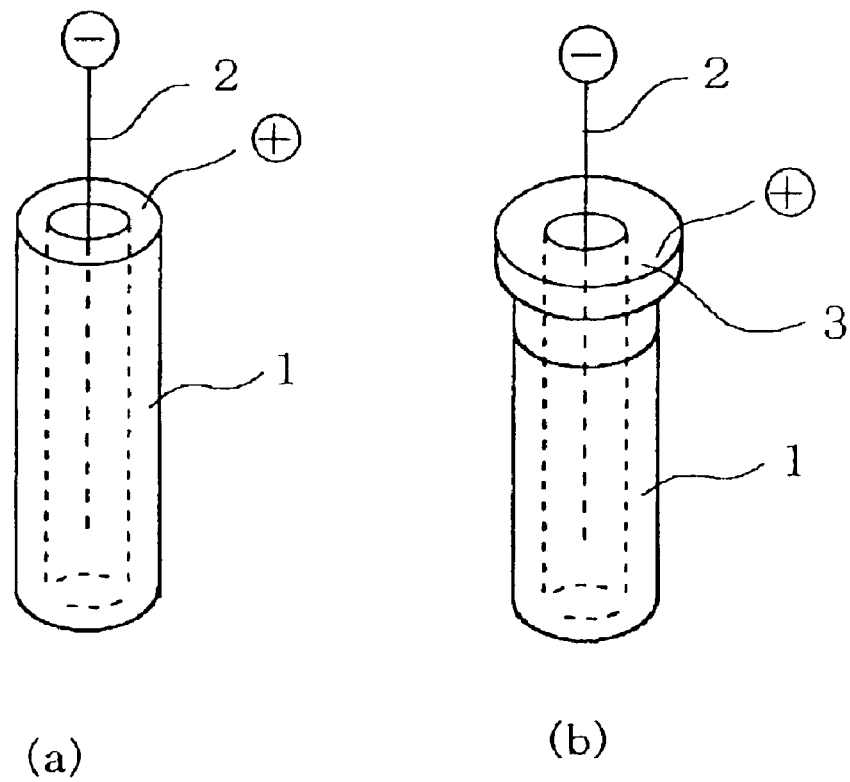
FIG. 2 is a perspective view showing an electrode configuration according to the present invention.
Figure 2:
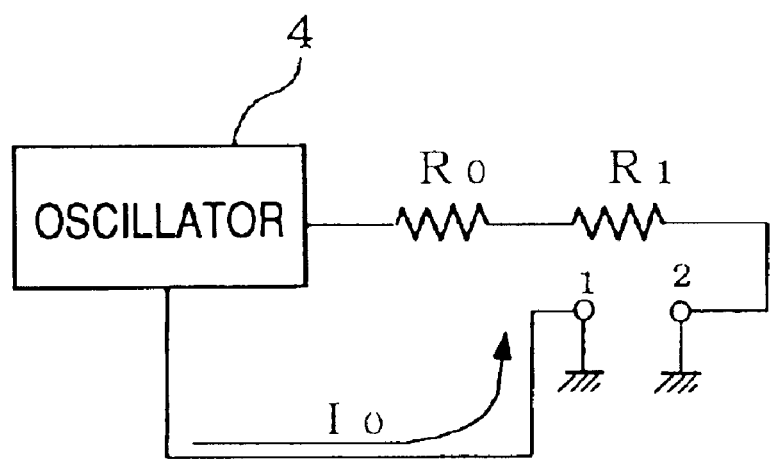

FIG. 2 is a perspective view showing the electrode configuration according to the present invention: (a) showing a first embodiment of the electrode configuration in which a cathode 2 composed of a single or a plurality of hollow cylindrical, bar-shaped or linear electrically conductive metals is disposed in parallel with an axis of a hollow cylindrical anode 1.

The anode 1 is configured in a form of a hollow cylinder, and formed by mixing clay or glass or a mixture thereof with 2 to 15% by weight of a transition metal and 1 to 10% of an oxidized transition metal, sintering the mixture in a range from 800 to 1500° C., then coating the mixture with anatase type titanium oxide, thin oxide, ruthenium oxide and fine particles of platinum as a glaze, and sintering the mixture again at a temperature from 580 to 980° C.

FIG. 2(*b*) shows a second embodiment of the electrode configuration in which a anode section is composed by covering a anode 2 with a cap 3 made of an electrically conductive metal.

(c) schematically shows a circuit in an electrode tank in which a pulse current is applied between two electrodes. A current $I_0$ to which is output from an oscillator 4 in shapes of pulses is supplied in a direction indicated by an arrow and discharged between the anode 1 and the cathode 2. Reference symbols $R_0$ and $R_1$ represent resistors.

The anode 1 and the cathode 2 are kept in a condition submerged in water and connected to the oscillator 4 which oscillates a current having a frequency of 10 to 100 kHz and a current density of 0.1 μA/cm$^2$ to 10 mA/cm$^2$.

Figure 3:
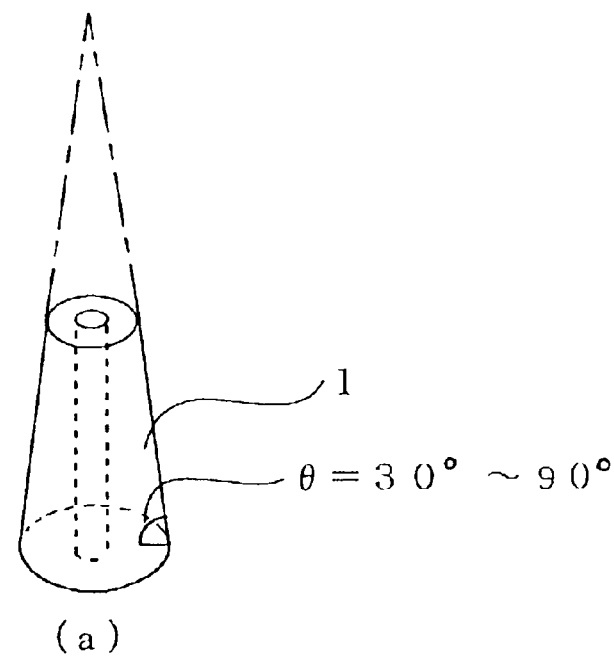
FIG. 3 is a diagram showing a third embodiment of the present invention: (a) being a perspective view of a hollow truncated circular cone and (b) being a sectional view showing a case where anodes are piled in multiple stages.
Figure 3:
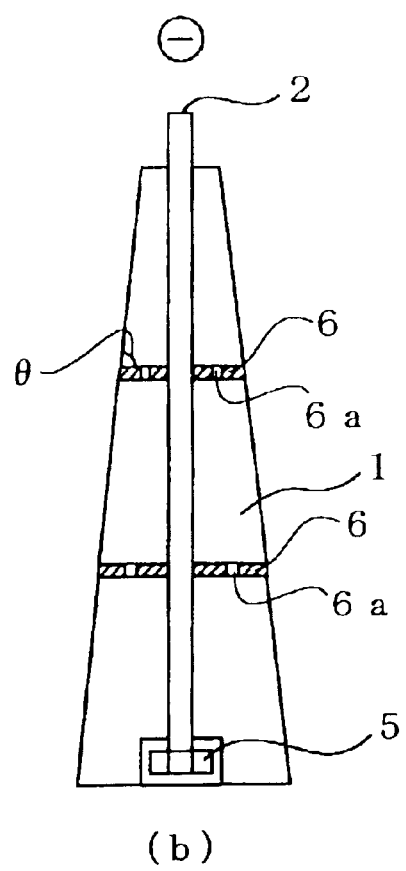

FIG. 3(*a*) shows a third embodiment of the electrode configuration in which a anode 1 has a form of a hollow truncated pyramid and a root angle of 30° to 90°.

FIG. 3(*b*) shows an embodiment in which the anode 1 according to the first embodiment is piled at multiple stages and an outer circumference of each anode 1 is sheathed with an electrically conductive water scaling material.

A multi stage assembling mode is adopted for the electrode tank in view of easy manufacturing of the overcoat. A fixed portion at a lower part of the electrode section of the electrode tank is fixed with a bolt or the like and composed of an insulating water sealing material as a whole.

Figure 9:
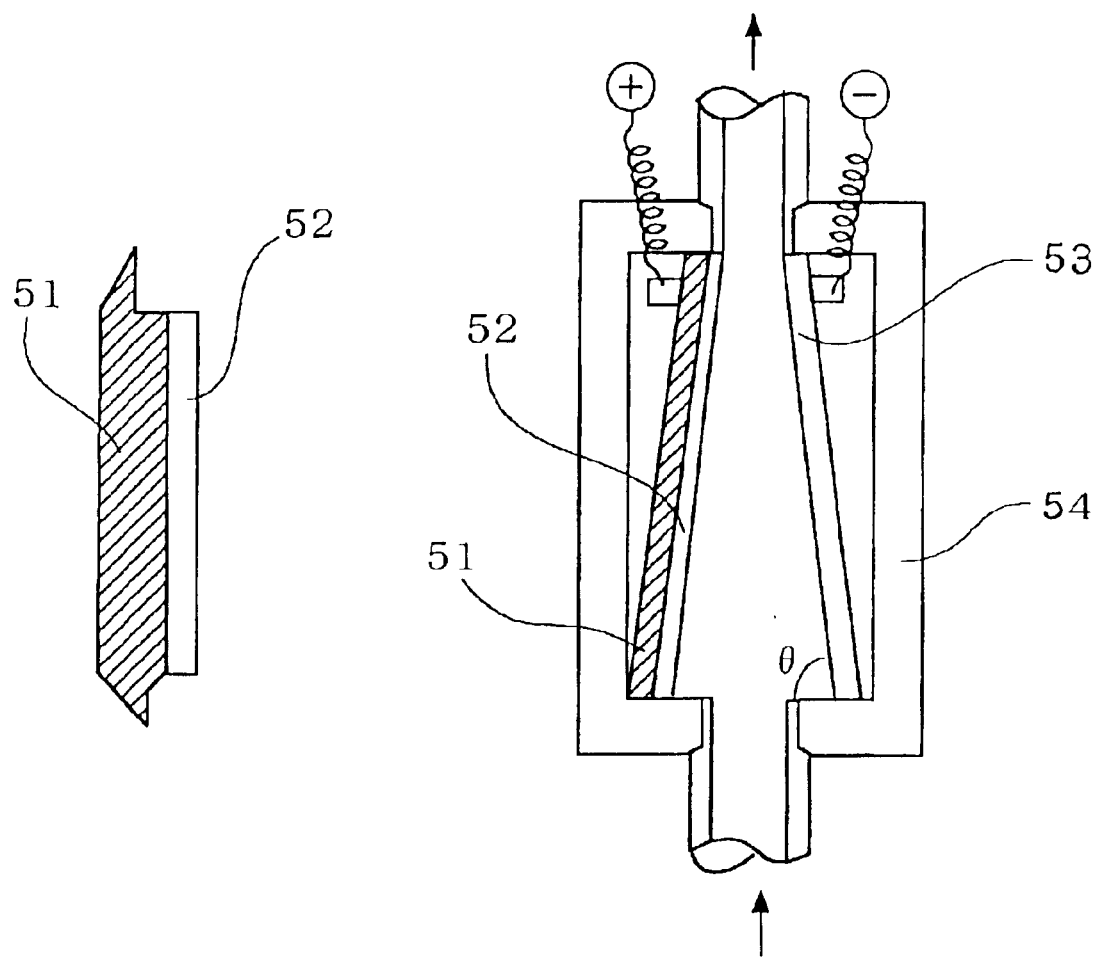
FIG. 9 is a sectional view showing an anode and a cathode which are disposed in opposition to each other in a conventional water treatment apparatus.
Figure 10:
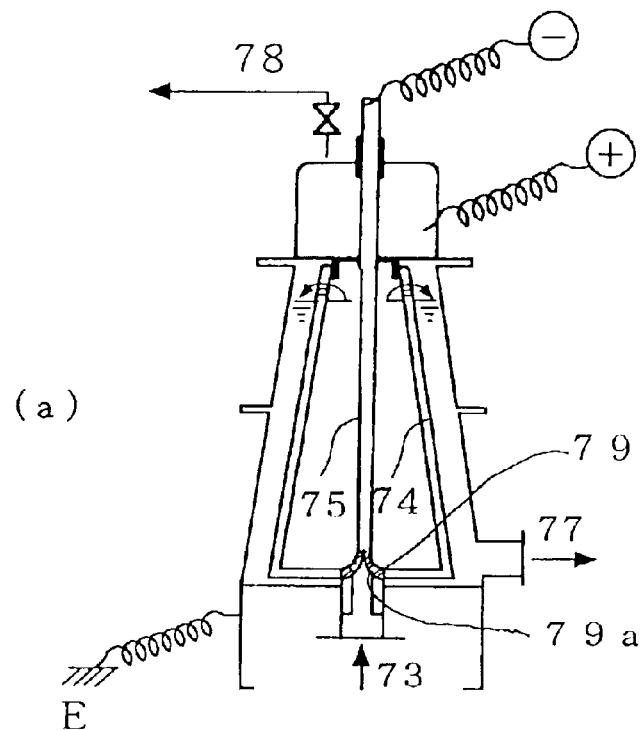
FIG. 10 is a sectional view showing configurations of an electrode having a form of a truncated circular cone and an electrode having a form of a truncated pyramid.
Figure 10:
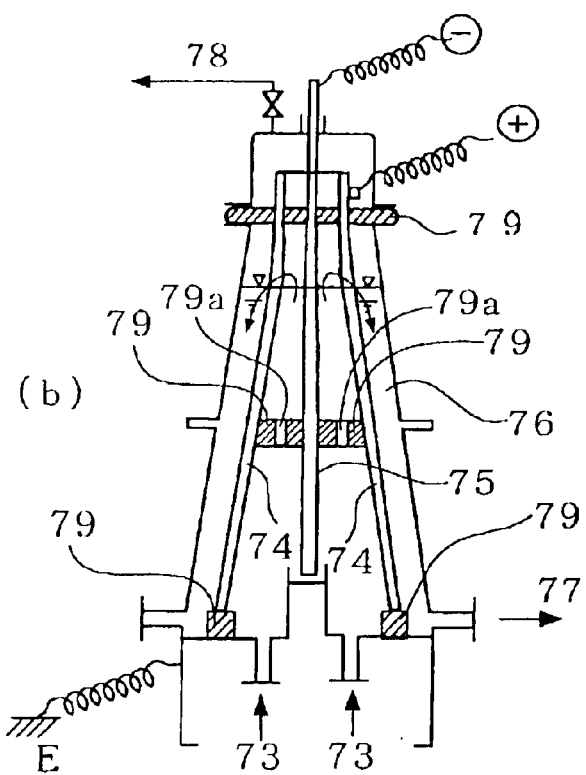

Formed at a connected part of each anode 1 is a connecting part 6 made of the insulating water sealing material and formed in the connecting part 6 is a path 6*a* for the raw water. It is possible to select for the raw water either of a case where the raw water is flowed from an upper section to a lower section of the apparatus and a case where the raw water is flowed from the lower section to the upper section of the apparatus, and raw water is flowed from a lower section to an upper section of an apparatus in a conventional example shown in FIGS. 9 and 10.

Figure 4:
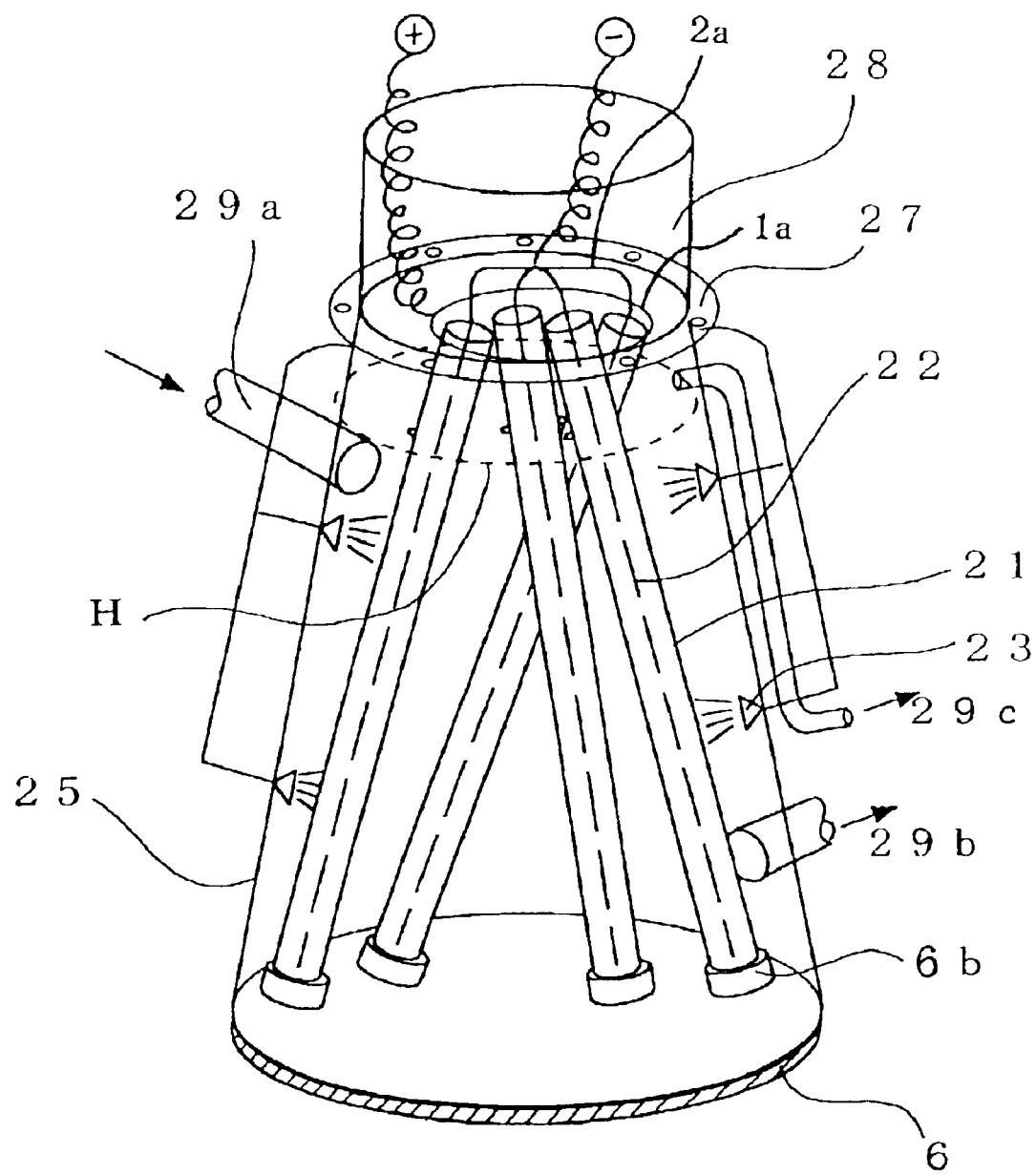
FIG. 4 is a partially transmitted perspective view showing a fourth embodiment of the electrode configuration according to the present invention.

A fourth embodiment of the electrode configuration is shown in FIG. 4, in which a reference numeral 21 represents an anode, a reference numeral 22 designates a cathode, a reference numeral 23 denotes a cleaning water spraying port for cleaning an interior of the electrode tank with cleaning water from a cleaning pipe connected to a high pressure pump, a reference numeral 25 represents an overcoat having an outer circumference treated with a water sealing material, a reference numeral 27 designates a flange, a reference numeral 28 denotes a cap, a reference numeral 29*a* represents a raw water inlet port, a reference numeral 29*b* designates a treated water outlet port, a reference numeral 29*c* denotes a liquid bubble discharge port, a reference numeral 6 represents a connecting part made of the water sealing material and a reference numeral 6*b* designates an insulating-supporting part for connecting a lower portion of an electrode 1 to the connecting part. A path 6*a* for precipitate is formed in the connecting part 6 though not shown.

The electrode 1 is inserted into the overcoat 25 in an appropriate number, lower portions of the electrodes 1 are fixed to the connecting part 6 with the insulating-supporting parts 6*b* and upper portions of the electrodes 1 are fixed to a water sealing plate (not shown) made of the water sealing material which is disposed on the flange. The anodes 1 and a cathode 2 are connected to a power source by way of electrode supporting metal fittings 1*a*, 2*a* and an insulated conductor.

The liquid bubble discharge port 29*c* serves for discharging bubbles to be produced in a water surface H located above the raw water inlet port 29*a*.

Figure 5:
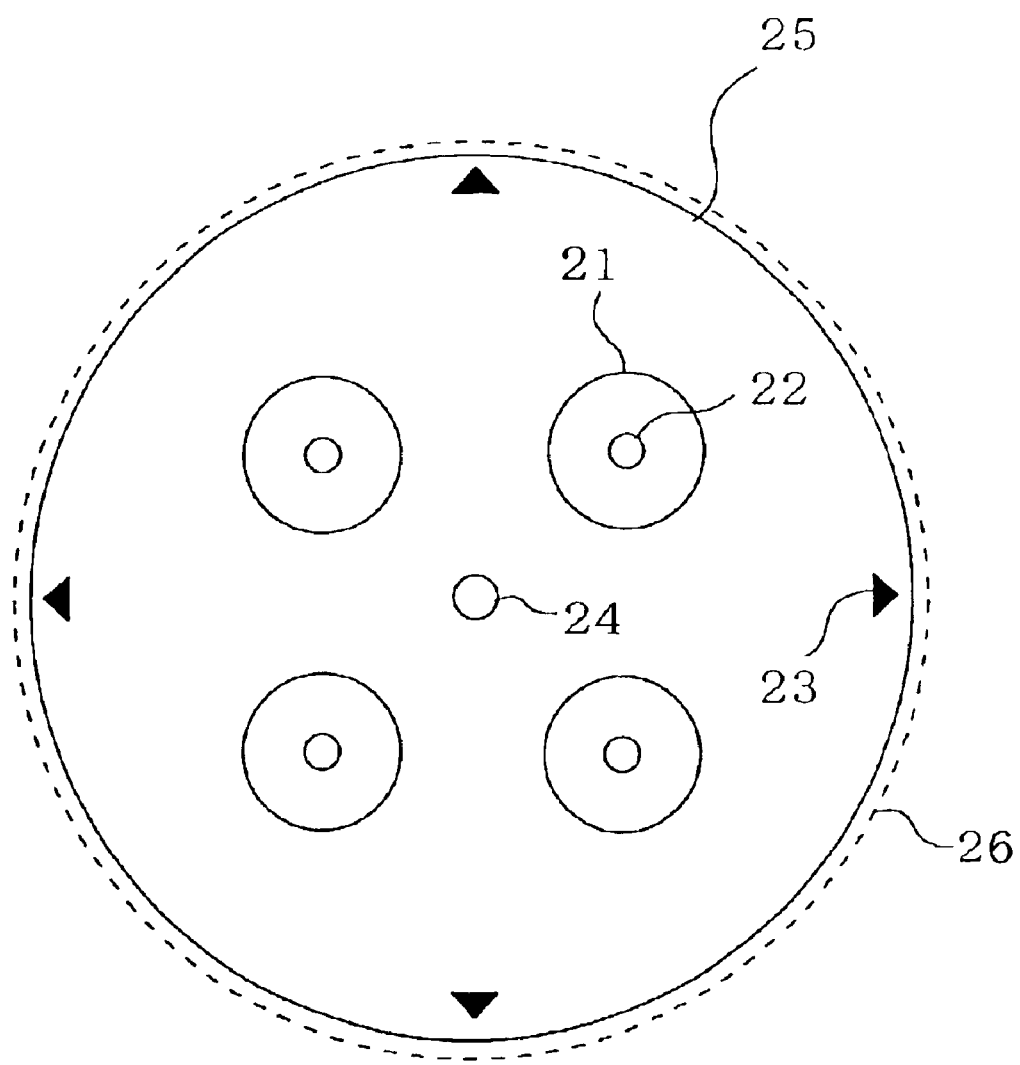
FIG. 5 is a sectional view showing a fifth embodiment of the electrode configuration according to the present invention.

A fifth embodiment of the electrode configuration is shown in FIG. 5, in which a reference numeral 21 represents a cylindrical anode, a reference numeral 22 designates a cylindrical cathode, a reference numeral 23 denotes a nozzle (cleaning water spraying port), a reference numeral 24 denotes a nozzle (cleaning water spraying port) disposed at a center portion, a reference numeral 25 represents an outside pipe (overcoat), a reference numeral 26 designates a non-metallic net like shield which is formed so as to cover an outer circumference of the overcoat.

The cylindrical cathode 22 is configured to have a form of a hollow cylinder, a through hole formed in an outer circumference thereof and a top portion connected to a cleaning pipe so that cleaning water shoots out of the cathode.

Figure 6:
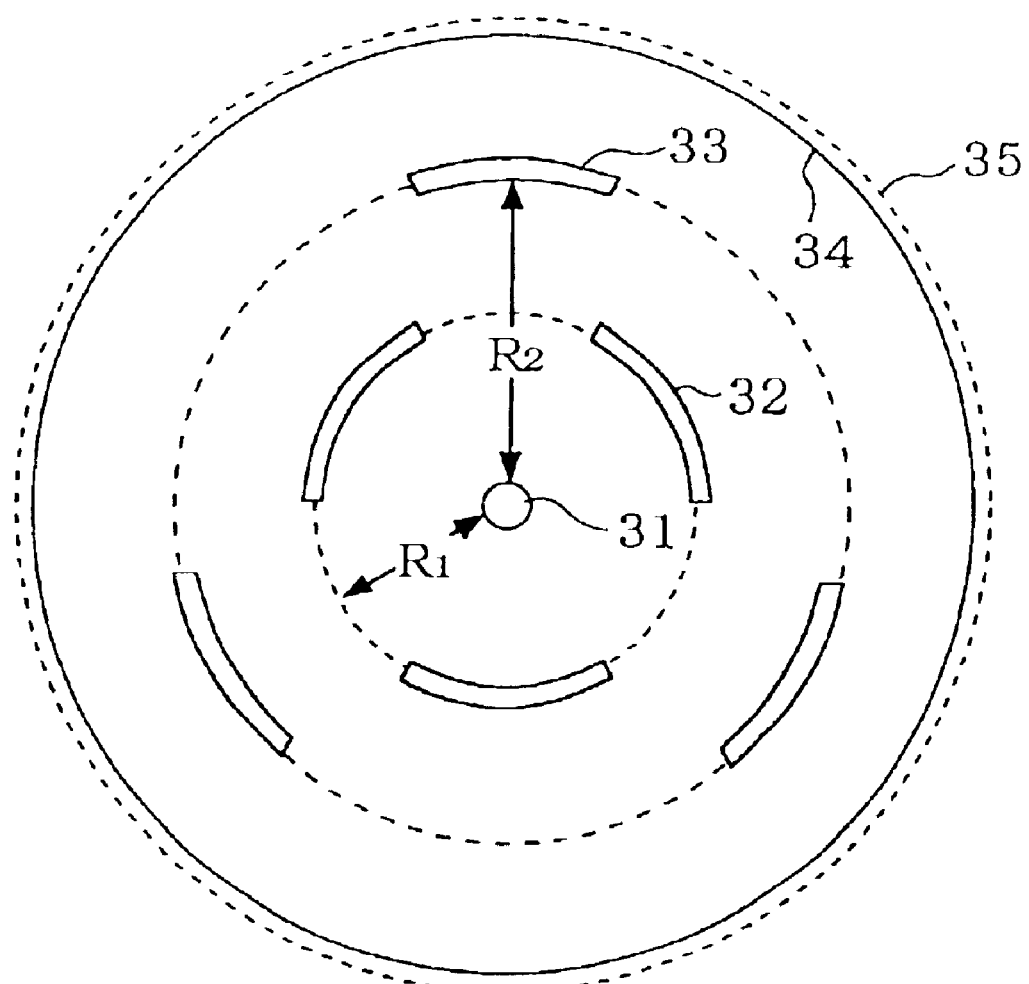
FIG. 6 is a sectional view showing a sixth embodiment of the electrode configuration according to the present invention.

A sixth embodiment of the electrode configuration which is a cylindrical, electrode configuration is shown in FIG. 6, in which a reference numeral 31 represents a cathode, a reference numeral 32 designate anodes, a reference numeral 34 denotes an outside pipe(overcoat) and a reference numeral 35 represents a shield. In this embodiment, the cathode is configured to have a form of a hollow cylinder, and the anodes 32 are disposed as arch-like electrodes on a circumference around the cathode 31 which has radii of R1 and R2 (R2=R1/2), whereby an entire surface of the outside pipe 35 is covered with the anodes 32 and 33 as seen from the cathode 31.

Figure 7:
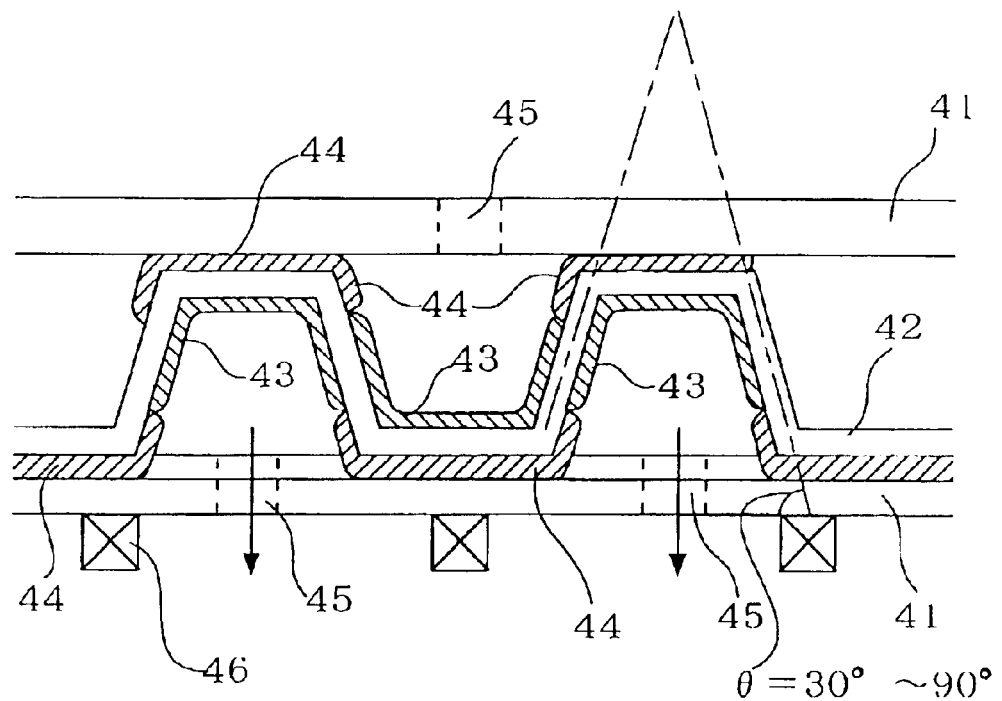
FIG. 7 is a sectional view showing a seventh embodiment of the electrode configuration according to the present invention.

FIG. 7 shows a seventh embodiment of the electrode configuration in which the electrode configuration has a rectangular shape: (a) being a sectional view and (b) being a perspective view. In FIG. 7, a reference numeral 41 represents a cathode, a reference numeral 42 designates an anode which supports an electrically conductive body made of a metal oxide, a reference numeral 43 denotes a welded layer (anode) or sintered layer composed of a metal oxide, a reference numeral 44 represents an insulator, a reference numeral 45 designates a raw water passing hole and a reference numeral 46 denotes an insulator for insulating rectangular electrodes to be laminated in a plurality of layers from one another. The insulators 44 and 46 are made of a ceramic.

The anode 42 having a trapezoidal section is disposed so that an angle θ formed between a surface of the cathode 41 and an oblique line of the anode is set at 30° to 90°. The trapezoidal anode 42 is disposed between the cathodes 41 which are arranged in parallel. Formed in concave portions of the anodes 42 are metal oxide layers 43 by welding a transition oxidized metal or sintering the transition oxidized metal at 580 to 980° C. and disposed on both side of a convex portion of the anode 42 are the insulators 44. The anode 42 is configured to be in contact with an electrically conductive metal plate which is the cathode 41.

The anode 42 is configured as a segment which has dimensions of 5 to 10 mm high by 50 to 100 cm wide by 10 to 70 cm high.

Figure 8:
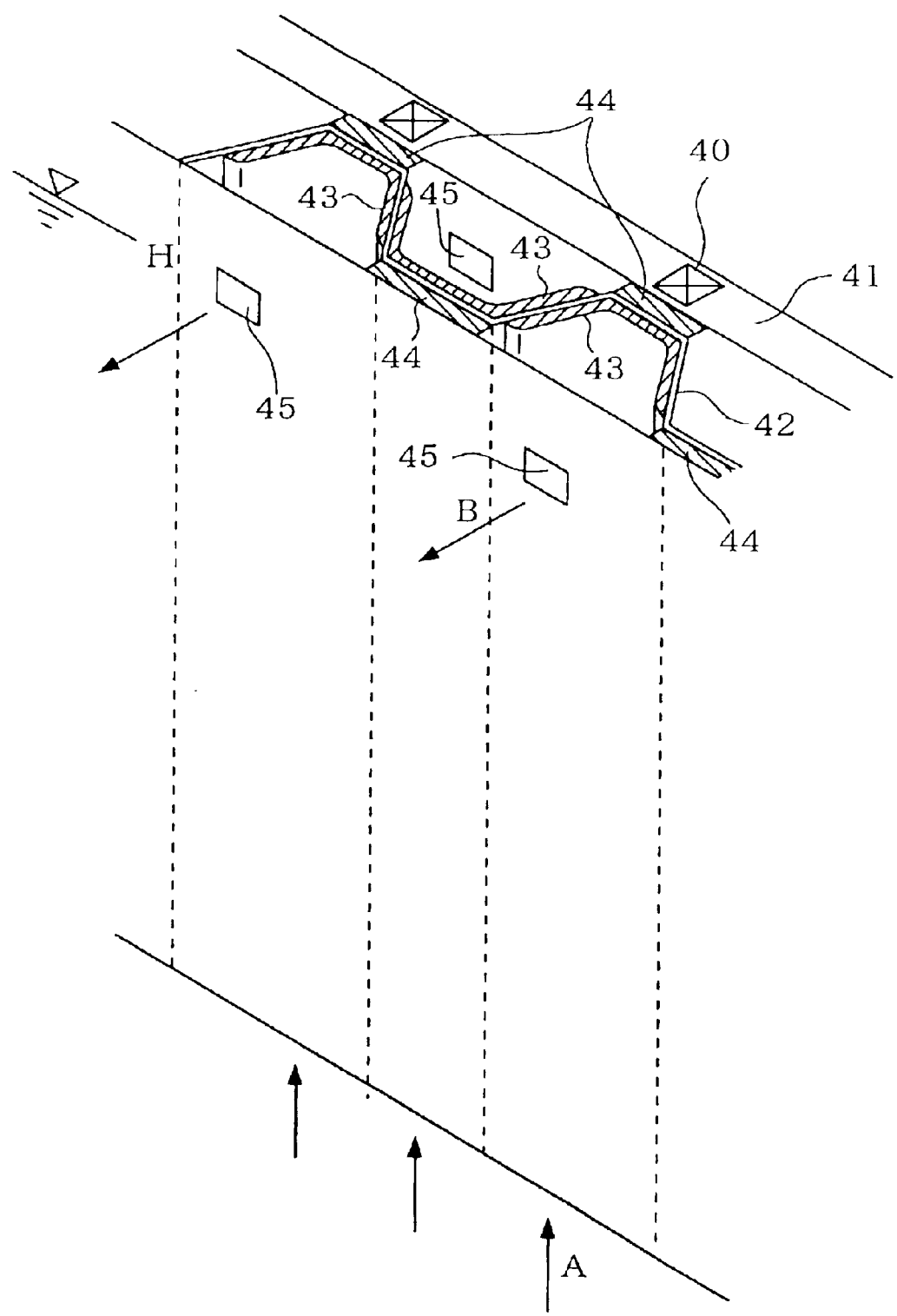
FIG. 8 is a perspective view showing the seventh embodiment of the electrode configuration according to the present invention.

As apparent from FIG. 8, raw water rises in a direction indicated by an arrow A, passes through a passing hole 45 and flows in a direction indicated by an arrow B in a seventh embodiment.

INDUSTRIAL APPLICABILITY

The apparatus according to the present invention is capable of performing a stable treatment even by combining a low frequency-low current with a high frequency-slight current since hydroxyl radicals and oxygen radicals are generated stably in a high frequency region and a low frequency region, and a current is supplied stably and consumed power is reduced even in a treatment of wastewater containing a large mount of ions.

Furthermore, the apparatus is applicable to a water treatment facility on a large scale since the apparatus is capable of operating continuously. Furthermore, even when electric resistance of raw water changes during a treatment, the apparatus is capable of performing a stable treatment with an adjustment of a pulse voltage to be applied.

The apparatus exhibits a remarkable effect for cleaning domestic wastewater and removal of blue powder in particular in addition to effects to use no chemical, require a small area for a facility and facilitate operations.

What is claimed is:

1. An apparatus for cleaning dissolved organic matters and a trace amount of injurious materials consisting of an anode formed or welded by forming a mixture by mixing at least one selected from clay and glass with a material comprising 2 to 15% by weight of a transition metal and 1 to 10% of an oxidized transition metal, sintering the mixture within a range from 800 to 1500° C., forming a glazed mixture by coating a surface of the mixture with a material prepared by mixture of anatase type titanium oxide, tin oxide, ruthenium oxide and fine particles of platinum as a glaze, and sintering the glazed mixture at a temperature of 580 to 980° C.

2. The apparatus for cleaning dissolved organic substances and a trace amount of injurious materials according to claim 1, characterized in that said anode is configured in a cylindrical form and an electrically conductive metal is fitted in an end of the anode.

3. The apparatus for cleaning dissolved organic substance and a trace amount of injurious materials according to claim 2, characterized in that at least an electrically conductive metal is inserted in parallel with an axis of said cylindrical anode.

4. The apparatus for cleaning dissolved organic substances and a trace amount of injurious materials according to claim 2 or 3, characterized in that a pulse voltage and a current are applied to said electrically conductive metal.

5. The apparatus for cleaning dissolved organic substance and a trace amount of injurious materials according to any one of claims 2 to 3, characterized in that a cathode is disposed at a center of said cylindrical anode.

6. The apparatus for cleaning dissolved organic substance and a trace amount of injurious materials according to claim 5, characterized in that said anode and said cathode are kept in a condition submerged in water and connected to an oscillator which oscillates an average current density of 0.1 $\mu A/cm^2$ to 10 $mA/cm^2$ at a frequency of 5 Hz to 50 MHz and a voltage of 0.2 kV/cm to 20 kV.

7. The apparatus for cleaning dissolved organic substances and a trace amount of injurious materials according to claim 5, characterized in that raw water is flowed downward from an upper portion of a side wall of said anode and is oxidized and cleaned by various kinds of active species (radicals) generated between said cathode and an anode.

8. The apparatus for cleaning dissolved organic substances and a trace amount of injurious materials according to claim 2 or 3, wherein said anode has a rectangular or truncated pyramidal concave portion.

9. The apparatus for cleaning dissolved organic substance and a trace amount of injurious materials according to claim 8, characterized in that a transition metal oxide is sintered in the concave portion of said anode at 580 to 980° C. and electrically conductive metal plates are formed on both side of the electrode as a cathode by way of an insulator.

10. The apparatus for cleaning dissolved organic matters and a trace amount of injurious materials according to any one of claims 2 to 3, characterized in that said anode measures 5 to 10 mm thick by 5 to 100 cm wide by 10 to 70 cm high.

* * * * *